United States Patent [19]

Ogawa

[11] Patent Number: 4,897,188
[45] Date of Patent: Jan. 30, 1990

[54] FILTERING DEVICE

[75] Inventor: Yonekichi Ogawa, Tokyo, Japan

[73] Assignee: Suisaku Kabushiki Kaisha, Tokyo, Japan

[21] Appl. No.: 192,448

[22] Filed: May 11, 1988

[51] Int. Cl.[4] ............................................. A01K 63/04
[52] U.S. Cl. ................................ 210/169; 210/416.2; 119/5
[58] Field of Search ................. 210/169, 416.2; 119/3, 119/5

[56] References Cited

U.S. PATENT DOCUMENTS

| | | | |
|---|---|---|---|
| 2,848,111 | 8/1958 | Gare | 210/169 |
| 2,935,199 | 5/1960 | Willinger | 210/169 |
| 3,151,069 | 9/1964 | Halpert | 210/169 |
| 4,035,298 | 7/1977 | Cloke et al. | 210/169 |
| 4,268,387 | 5/1981 | Hall | 210/169 |
| 4,556,485 | 12/1985 | Ogawa | 210/169 |
| 4,620,924 | 11/1986 | Goldman et al. | 210/169 |

FOREIGN PATENT DOCUMENTS

| | | | |
|---|---|---|---|
| 2416470 | 10/1975 | Fed. Rep. of Germany | 119/5 |
| 3044376 | 6/1982 | Fed. Rep. of Germany | 119/5 |
| 3136383 | 3/1983 | Fed. Rep. of Germany | 210/169 |
| 810968 | 3/1959 | United Kingdom | 210/169 |

Primary Examiner—Richard V. Fisher
Assistant Examiner—Coreen Y. Lee
Attorney, Agent, or Firm—Armstrong, Nikaido, Marmelstein, Kubovcik & Murray

[57] ABSTRACT

A filtering device includes a water suction case having a plurality of water suction ports connected to water flow passages formed therein so as to make gravel spreaded over the bottom of a water basin perform the filtering operation. The case is buried in the gravel, and a pumping means is connected to the water suction case so as to circulate water in the passage to the upper portion of the water basin. The water suction case includes a first suction portion extending linearly to form a first passage constituting a part of said water flow passages, a plurality of linear second suction portions provided perpendicularly to the first suctin portion at positions leaving spaces with each other in the longitudinal direction of the first suction portion to form second passages constituting a part of said water flow passages, said second passages communicating perpendicularly with the first passage, and a third suction portion provided perpendicularly to the first suction portion at tion portion in parallel with the first suction portion to form a third passage constituting a part of said water flow passages, said third passage communicating commonly with the respective second passages. Collars extending at both sides are integrally projected from the first, second and third suction portions. The water suction ports are perforated in the first, second and third suction portions at positions lower than the collars, and the cross sectional area of the third passage is set larger than that of the first and second passages.

8 Claims, 11 Drawing Sheets

FILTERING DEVICE

BACKGROUND OF THE INVENTION

1. Field of the Invention

The present invention relates to a filtering device comprising a water suction case having a plurality of water suction ports connected to water flow passages formed therein so as to make gravel spreaded over the bottom of a water basin perform the filtering operation, the case being buried in the gravel to be disposed, and a pumping means connected to the water suction case so as to circulate water in the passage to the upper portion of the water basin.

2. Description of the Prior Art

Such conventional filtering devices are generally used as so-called bottom type filtering devices using gravel as a filtering material, and a plurality of water suction ports are heretofore perforated at the upper surface of the water suction case of flat box shape (e.g., Japanese Patent Laid-open No. 172322/1985).

However, when burying the water suction case in the gravel in the above-mentioned conventional filtering device, it is difficult to do so under the state that the gravel has already been spreaded over the bottom of a water basin. Therefore, it is necessary to gravel from above the water suction case which is mounted in the state that the gravel is removed. Further, since the water suction port is directly covered with the gravel, the suction port is feasibly clogged up.

SUMMARY OF THE INVENTION

It is therefore an object of the present invention to provide a filtering device wherein a water suction case can be easily buried in gravel spreaded over the bottom of a water basin and can prevent the water suction ports from being clogged up as much as possible.

According to the present invention, the above object is accomplished by providing a filtering device wherein a water suction case is comprised of a first suction portion extending linearly to form a first passage constituting a part of water flow passages, a plurality of linear second suction portions provided perpendicularly to the first suction portion at positions leaving spaces with each other in the longitudinal direction of the first suction portion to form second passages constituting a part of said water flow passages, said second passages being communicating perpendicularly with the first passage, and a third suction portion provided perpendicularly to the individual second suction portion in parallel with the first suction portion to form a third passage constituting a part of said water flow passages, said third passage being communicating commonly with the respective second passages, flanges extending at both sides are integrally projected from the first, second and third suction portions, the water suction ports are perforated in the first, second and third suction portions at positions lower than the flanges, and the cross sectional area of the third passage is set larger than that of the first and second passages.

With such arrangement, the first, second and third water suction portions are formed linearly, and vacant spaces are provided thereamong. Therefore, the water suction case can be easily buried in gravel. Since the water suction port is disposed lower than the flanges, the water suction port is faced to the cavity generated in the gravel to prevent the water suction port from being clogged up by the gravel as much as possible. Further, since the cross sectional area of the third passage is larger than that of the first and second passages, the water can be sucked uniformly over the entire area of the water suction case.

It is another object of the present invention to provide a filtering device wherein a sufficient filtering can be performed by adding the filtering action by using the filtering material in addition to the filtering action by the gravel.

It is a still further object of the present invention to provide a filtering device wherein both the filtration by the gravel and the filtration by the filtering material are employed, and the device can be easily mounted in a water basin.

The above and other objects, features and advantages of the invention will become apparent from reading of the following description taken in conjunction with the accompanying drawings.

BRIEF DESCRIPTION OF THE DRAWINGS

FIGS. 1 to 12 illustrate one embodiment of the present invention, wherein

DESCRIPTION OF THE PREFERRED EMBODIMENTS

The present invention will now be described by way of embodiments will reference to the accompanying drawings.

Figure 1:
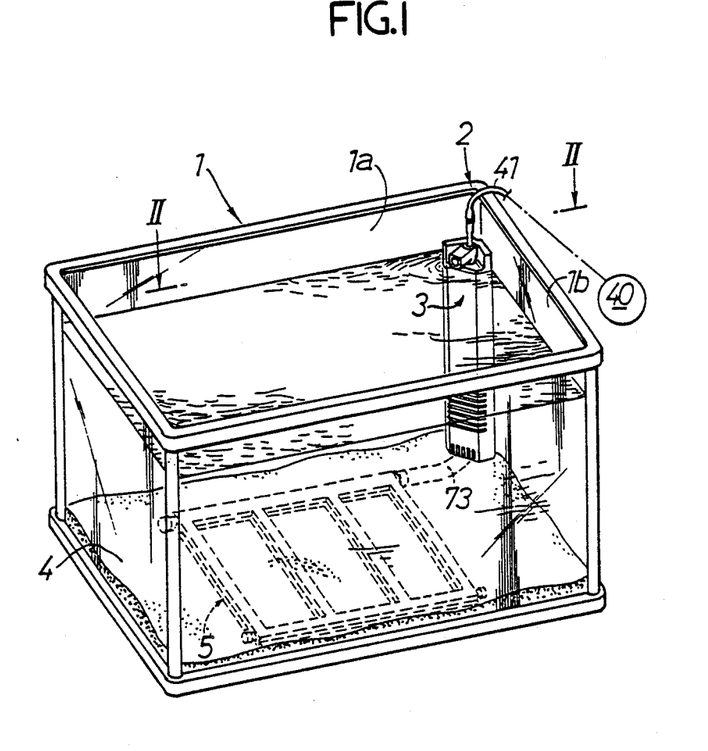
FIG. 1 is a perspective view of the whole of a filtering device.
Figure 2:
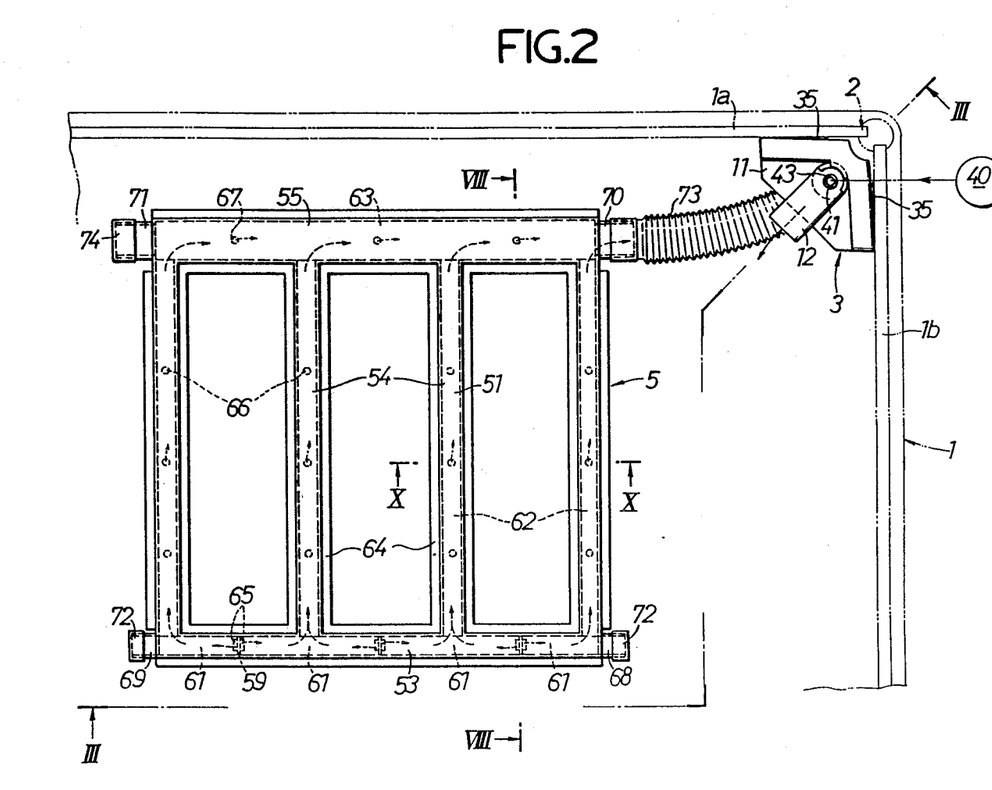
FIG. 2 is an enlarged sectional view taken along the line II—II of FIG. 1.
Figure 3:
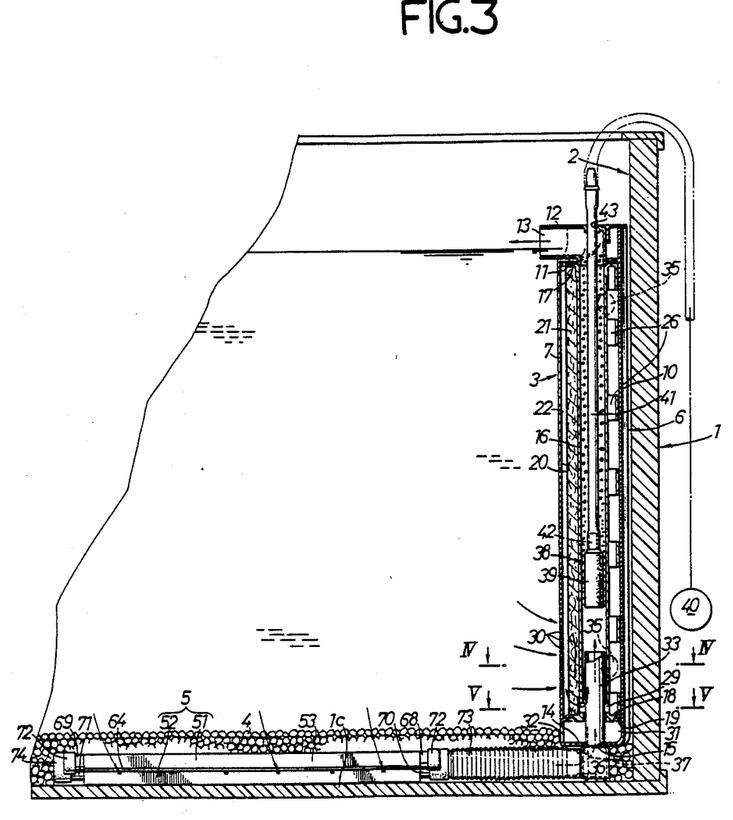
FIG. 3 is a sectional view taken along the line III—III of FIG. 2.

Referring first to FIG. 1 illustrating one embodiment of the present invention, there is shown a basin 1 shaped into a box-like configuration for cultivating aquarium fishes such as goldfishes, tropical fishes and saltwater fishes. A filtering case 3 of a filtering device according to the present invention is attached to a corner 2 formed by two side surfaces 1a and 1b, intersecting at a right angle, of the basin 1. A water suction case 5 is mounted on the bottom of the basin 1 so as to be buried in gravel 4 spreaded over the bottom thereof. Water passed through the gravel 4 and purified is introduced from the water suction case 5 into the filtering case 3, and further circulated together with the water filtered through the filtering case 3 to the upper portion in the basin 1.

Referring also to FIGS. 2 to 6, the filtering case 3 is basically, for example, formed of synthetic resin into a cylindrical shape having a such cross-sectional configuration that a back wall 6 disposed to be faced to the corner 2 and a front wall 7 disposed to be faced inwardly of the water basin 1 in the attached state are interconnected to form a closed section.

The back wall 6 is comprised of a pair of mounting portions 8 and 9 connected by a connecting portion 10. The mounting portions 8 and 9 are disposed with an angle formed by both of them being slightly larger than the angle formed by the side surfaces 1a and 1b of the water basin 1, i.e., 90 degree, and the connecting portion 10 is shaped into a circular arc curved to be convex toward the corner 2. On the other hand, the front wall 7 is shaped into such a trapezoidal converging inwardly of the water basin 1 that both side ends of the front wall 7 and the outer ends of the mounting portions 8 and 9 of the back wall 6 are overlapped to be interconnected.

A ceiling plate 11 is provided integrally with the upper end of the front wall 7 to close the upper end of the filtering case 3 when connected to the back wall 6. A drain pipe 12 is provided at the center of the ceiling plate 11 to extend upward so that the inner end of the drain pipe 12 is lightly projected into the filtering case 3 and that the pipe 12 is bent inwardly of the water basin 1 to form a drain port 13. Plate portions are provided at the lower ends of the front and back walls 7 and 6 so as to form a bottom plate 14 for closing the lower end of the filtering case 3 when they are interconnected. A through hole 15 is perforated at the center of the bottom plate 14.

A suction pipe 16 is fixedly disposed at the center in the filtering case 3 so as to extend vertically. More specifically, supporting plates 17 and 18 of the shape corresponding to that of the inner surface of the cross-section of the filtering case 3 are attached integrally to the upper and lower ends of the suction pipe 16. Supporting collars 19 are projected from the lower inner surfaces of the back and front walls 6 and 7 so as to support the supporting plate 18, and the supporting plate 18 is supported by the supporting collar 19 in the state that the upper supporting plate 17 is abutted to the ceiling plate 11, and the suction pipe 16 is attached in the filtering case 3. Further, the inner end of the drain pipe 12 is fitted to the upper end of the suction pipe 17 of attached state, and the suction pipe 16 communicates with the drain port 13.

A filtering chamber 20 is defined between both the supporting plates 17 and 18 in the filtering case 3 in the state that the suction pipe 16 is attached. The filtering chamber 20 is divided into an outer unpurified chamber 22 and an inner purifying chamber 23 by a filtering material 21 attached to the suction pipe 16.

A pair of supporting arms 24 and 25 projected to the interconnected side of the back and front walls 6 and 7 are projected at a plurality of, e.g., seven positions perforated at an axial interval of the suction pipe 16, and a supporting arm 26 projected to the side of the connecting portion 10 of the back wall 6. A small-diameter shaft 27 extending in parallel with the suction pipe 16 is formed integrally with the tip ends of both the supporting arms 24 and 25, and a connecting portion 28 bent corresponding to the connecting portion 10 of the back wall 6 and formed so as to slightly extend from both side ends of the connecting portion 10 in parallel with both the mounting portions 8 and 9 is integrally formed at the tip end of the supporting arm 26, and the connecting portion 28 is abutted to the inner surfaces of the connecting portion 10 and both the mounting portions 8 and 9.

A filtering material 21 is formed in a rectangular mat-like shape, and wound on the supporting arms 24, 25, 26 of the suction pipe 16 while abutting both longitudinal ends with the supporting plates 17 and 18. In other words, both the lateral ends of the filtering material 21 are engaged with the connecting portion 28 of the tip end of the supporting arm 26 so as to be bent at the small-diameter shaft 27 of the tip ends of both the supporting arms 25 and 25.

As described above, the suction pipe 16 in which the filtering material 21 is mounted is mounted is attached into the filtering case 3 to divide the filtering chamber 20 in the entire longitudinal length into the unpurified chamber 22 and the purifying chamber 23, and the suction pipe 16 is disposed in the purifying chamber 23. In addition, a suction port 29 communicating with the lower portion of the purifying chamber 23 is provided in the lower portion of the suction pipe 16. A plurality of water intake ports 30 vertically spaced out are slit at the lower portion of the front wall 7 of the filtering case 3 so as to communicate with the lower portion of the unpurified chamber 22.

A water intake chamber 31 is defined between the bottom plate 14 of the filtering case 3 and the supporting plate 18 of the suction pipe 16, and a plurality of auxiliary water intake ports 32 of slit-like shape extending upward and downward are provided at the lower portion of the front wall 7 to communicate with the water intake chamber 31.

The water intake chamber 31 and the auxiliary water intake ports 32 introduce a small amount of water led around the filtering material 21 into the suction pipe 16, and the through hole 15 is closed when the filtering case 3 is solely used without the water suction case 5. However, when the filtering case 3 and the water suction case 5 are used together as in the embodiment described above, a connecting pipe 33 for introducing the water from the water suction case 5 to the suction pipe 16 is inserted from the through hole 15 to the lower portion of the suction pipe 16, and the auxiliary water intake ports 32 and the water intake chamber 31 does not substantially function.

On the other hand, a pair of upper and lower recesses 34 are formed so as to be vertically spaced out on the outer surfaces of both the mounting portions 8 and 9 of the back wall 6, respectively. Suckers 35 are fixedly mounted in the individual recesses 34 so as to be projected outward from the outer surfaces of the mounting portions 8 and 9.

A connecting pipe 33 has the sucker 35 at the closed lower end. The connecting pipe 33 is inserted from the through hole 15 to the lower portion of the suction pipe 16 in the state that the sucker 36 sucks to be attached to the bottom 1c of the water basin 1. Further, a connecting port 37 is formed at the lower side of the connecting pipe 33.

In order to suck the water of the purifying chamber 23 to the water intake port 13, a pumping means 38 is attached to the filtering case 3, and the pumping means 38 is comprised of the suction pipe 16, an air injecting member 39 disposed at the lower portion in the suction pipe 16, an air pump as a pressurized air supply source 40, and a hose 41 for connecting the air injecting member 39 to the pressurized air supply source 40.

The air injecting member 39 is formed of a gas-permeable material such as a foam synthetic resin into a cylindrical shape, and a connecting pipe 42 is provided integrally with the air injecting member 39. The connecting pipe 42 is connected to the one end of the hose 41, the hose 41 extends upward in the suction pipe 16 to be led outward of the water basin 1 from the water intake hole 43 provided at the upper portion of the drain pipe 12, and is connected at the other end to the pressurized air supply source 40 disposed out of the water basin 1.

In such pumping means 38, pressurized air is supplied from the pressurized air supply source 40, and air injected from the air injecting member 39 become fine air bubbles to rise in the suction pipe 16 and the drain pipe 12, thereby generating rising water streams in the suction pipe 16 and the drain pipe 12.

Referring also to FIGS. 7 to 10, the suction case 5 is constructed so that an upper case 51 and a lower case 52 both of which are formed of synthetic resin and are fitted to each other, and is comprised of a first suction portion 53 extending linearly, a plurality of, e.g., four second suction portions 54 perpendicularly disposed on the portion 53 at a plurality of, e.g., four positions thereon longitudinally leaving spaces with each other to extend linearly, and a third suction portion 55 disposed parallel to the first suction portion 53 to be commonly provided perpendicularly to the second suction portions 54.

The upper case 51 is formed in a substantially U shape opened downward in a cross-sectional shape at the portions formed with the first, second and third suction portions 53, 54, 55. The lower case 52 is formed in a Y shape comprised of a bottom plate portion 56 of a substantially V shape opened upward in a cross-sectional shape at the portions formed with the first, second and third suction portions 53, 54, 55 and a leg portion 57 formed integrally with the bent portion of the bottom plate portion 56, and the bottom plate portion 56 of the lower case 52 is fitted in the upper case 51. In addition, projections 58 are projected with a space thereamong to receive the upper end of the bottom plate portion 56 on the inner surface of the upper case 51.

Figure 11:
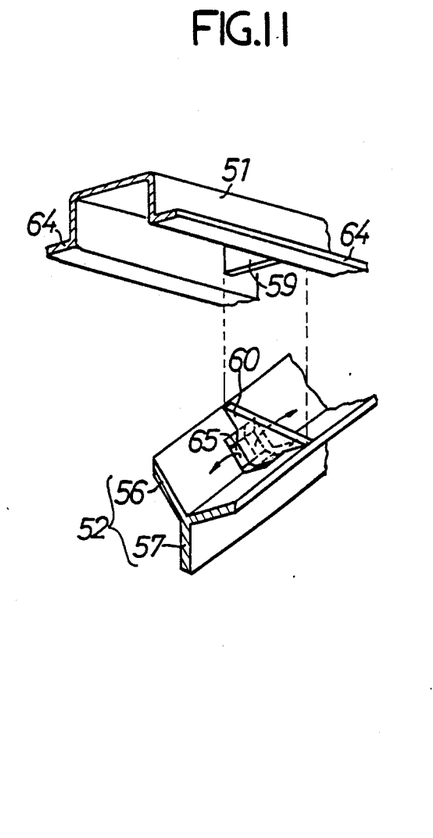
FIG. 11 is an enlarged perspective view of part of water suction case.

Referring also to FIG. 11, partition plates 59 and 60 abutting with each other for dividing the interior of the first suction portion 53 into a plurality of rooms are respectively projected in the upper and lower cases 51 and 52. Thus, a plurality of, e.g., four first passages 61 aligned longitudinally in one row are formed in the first suction portion 53. A second passage 62 are formed in each of the second suction portions 54. The second suction portions 54 are provided with the first suction portion 53 so that the second passages 62 individually communicate with the first passage 61. Further, a third passage 63 having a cross-sectional area larger than those of the first and second passages 61, 62 is formed in the third suction portion 55, and the second passages 62 communicate commonly with the third passage 63.

A flange 64 extending at both sides is formed integrally with the lower end opening edge of the upper case 51, and water suction ports 65, 66 and 67 are perforated at the lower case 52 under the flang 64. More specifically, at the portions corresponding to the first suction portion 53, small rectangular water suction ports 65 communicating at both sides of the partition plate 60 with the first passage 61 are respectively perforated at the connecting portion of the bottom plate portion 56 and the leg portion 57 of the lower case 52. Small-diameter suction ports 66 communicating with the second passages 62 are perforated at a plurality of, e.g., three positions leaving spaces longitudinally on the second water suction portion 54 of the connecting portion of the bottom plate portion 56 and the leg portion 57 of the lower case 52 at the portions corresponding to the second water suction portions 54. Further, a small-diameter water suction portions 67 are perforated at a plurality of, e.g., three positions leaving spaces longitudinally on the third water suction portion 55 at the connecting portion of the bottom plate portion 56 and the leg portion 57 of the lower case 52 at the portion corresponding to the third suction portion 55.

Semicircular projections are projected on the upper and lower cases 51 and 52 so as to construct connecting portions 68 and 69 of short tube shape when connected to each other at both ends along the longitudinal direction of the first suction portion 53. Further, semicircular projections are projected on the upper and lower cases 51 and 52 so as to construct connecting portions 70 and 71 when connected to each other at both ends along the longitudinal direction of the third suction portion 55.

Bottomed cylindrical caps 72 are fitted to the connecting portions 68 and 69 at both longitudinal ends of the first suction portion 53 so as to clamp the outer peripheries. Both the longitudinal ends of the first suction portion 53 are closed by the caps 72. One end of a flexible tube 73 is fitted to the connecting portion 70 at one longitudinal end of the third suction portion 55 so as to clamp the outer periphery. The other end of the flexible tube 73 is inserted to be connected to a connecting port 37 of the connecting tube 33. A bottomed cylindrical cap 74 is connected to the longitudinal end of the third suction portion 55 so as to clamp the outer periphery. Therefore, the third passage 63 in the third suction portion 55 communicate at its one end through the flexible tube 73 with the connecting tube 33.

In addition, the caps 72 are respectively fitted to the connecting portions 68 and 69, the flexible tube 73 is fitted to the connecting portion 70, and the cap 74 is fitted to the connecting portion 71, thereby the fitted states of the upper and lower cases 51 and 52 are maintained.

Description will now be made of the operating of this embodiment. In mounting such a filtering device to the basin 1, the filtering case 3 and the water suction case 5 are assembled, and the connecting pipe 33 is fixed to a bottom surface 1c of the basin 1. In other words, when the suckers 36 suck to be attached to the bottom surface 1c, the connecting tube 33 is fixed to the bottom 1c upright.

Then, the connecting tube 33 is inserted from the through hole 15 into the suction tube 16 to move down the filtering case 3 along the corner 2, and the filtering case 3 is fixed by the suckers 35 to the corner 2.

Figure 12A:
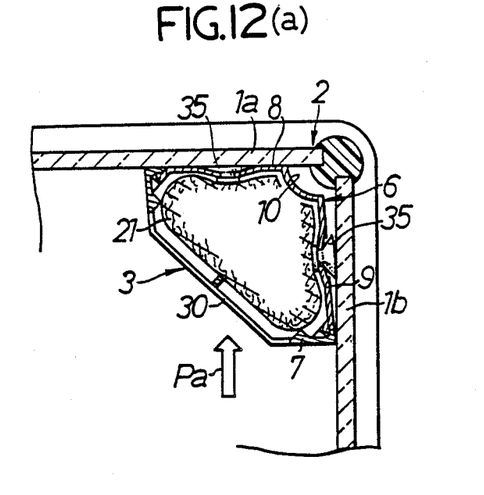
FIGS. 12(a) and 12(b) are sectional views corresponding to FIG. 4 showing the attaching procedure of a filtering case.
Figure 12B:
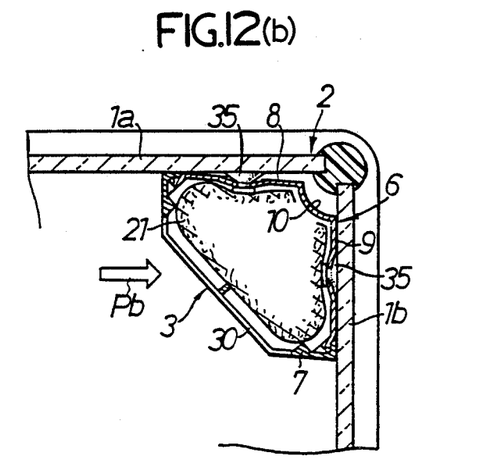

The mounting procedure of the filtering case 3 to the corner 2 will be described with reference to FIGS. 12(a) and 12(b) As shown in FIG. 12(a), one mounting portion 8 of the back wall 6 is first pressed toward one wall surface 1a in a direction of an arrow Pa so that the suckers 35 suck to be attached to the wall surface 1a. As shown then in FIG. 12(b), the other mounting portion 9 is pressed toward the other wall surface 1b in a direction of an arrow Pb so that the suckers 35 suck to be attached to the wall surface 1b. In this case, since the angle α formed between the mounting portions 8 and 9 is larger than the angle formed between the wall surfaces 1a and 1b, one mounting portion 8 is moved away at the connecting portion 10 from the wall surface 1a in the state that the end portion at the side of the front wall 7 is pressed to the wall surface 1a, and a sealed space between the suckers 35 and the wall surface 1a of the mounting portion 8 is depressurized. Therefore, the sucking strength of the suckers 35 increase to reliably mount the mounting portion 8 on the wall surface 1a.

Figure 4:
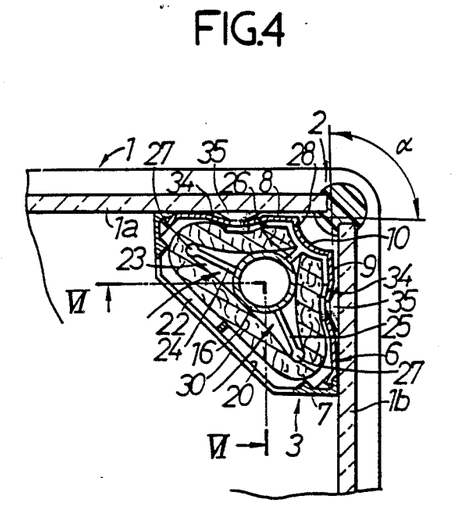
FIG. 4 is an enlarged sectional view taken along the line IV—IV of FIG. 3.
Figure 5:
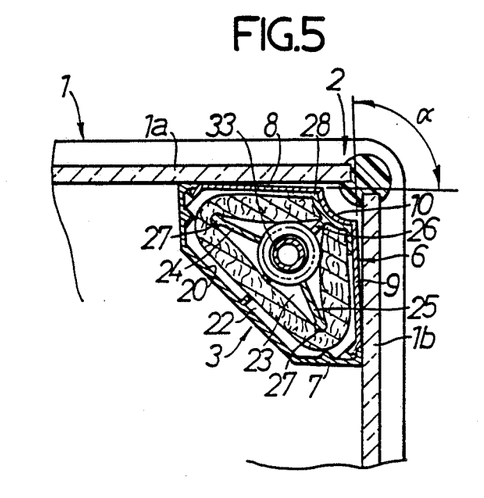
FIG. 5 is an enlarged sectional view taken along the line V—V of FIG. 3.
Figure 6:
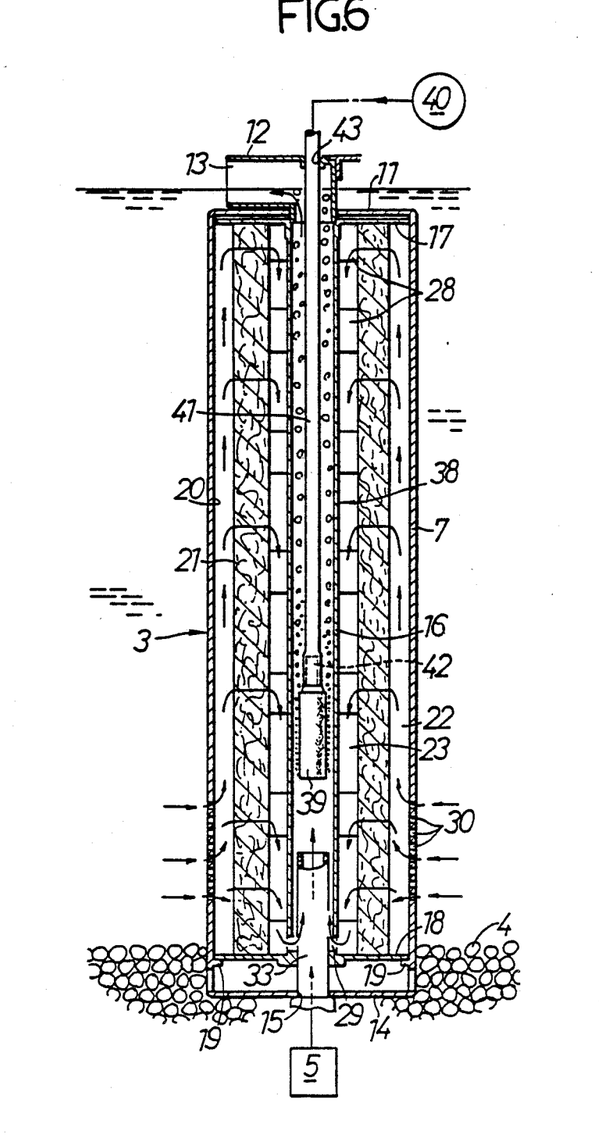
FIG. 6 is a sectional view taken along the line VI—VI of FIG. 4.
Figure 7:
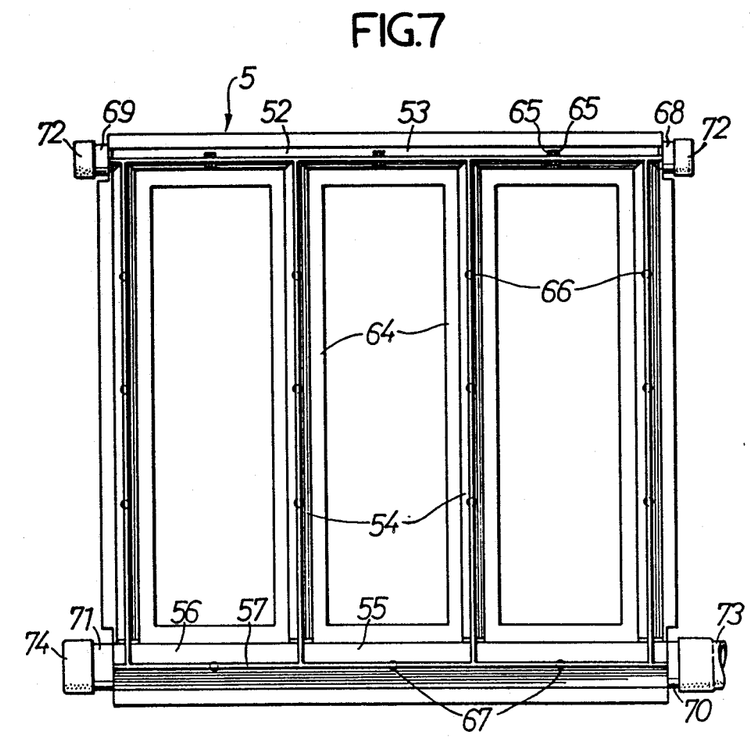
FIG. 7 is a bottom view of a water suction case.
Figure 8:
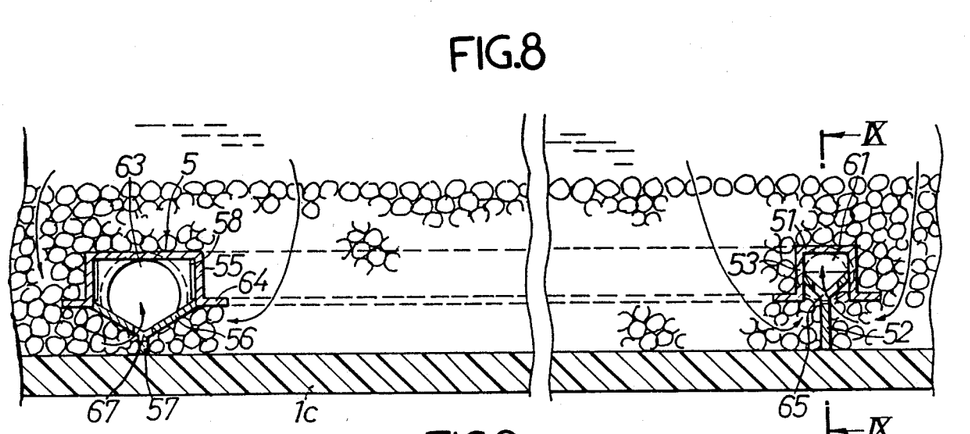
FIG. 8 is a sectional view taken along the line VIII—VIII of FIG. 2.
Figure 9:
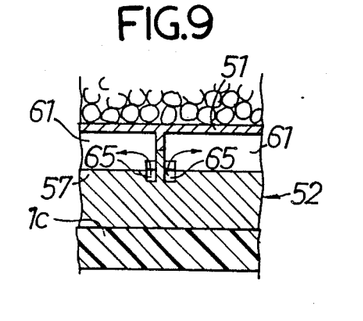
FIG. 9 is a sectional view taken along the line IX—IX of FIG. 8.
Figure 10:
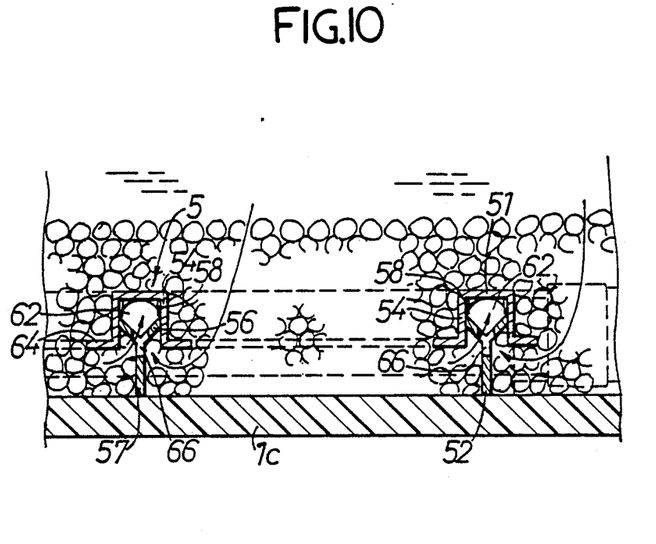
FIG. 10 is a sectional view taken along the line X—X of FIG. 2.

When the pressed state of the mounting portion 9 is released, the mounting portion 9 contacts the end portion at the side of the front wall 7 with the wall surface 1b by the sucking strength of the suckers 35 of the side of the mounting portion 8 to the wall surface 1a so that the side of the connecting portion 10 is moved away from the wall surface 1b as shown in FIG. 4. In this manner, similarly to the above description, the sealed space between the suckers 35 and the wall surface 1b is depressurized, the sucking strength of the suckers 35 increase to reliably mount the mounting portion 9 on the wall surface 1b. Further, in this mounting state, the water intake port 30 is defined so as to be disposed at the position above the gravel 4.

In such a state, the end portions at the side of the front wall 7 of the mounting portions 8 and 9 of the back wall 6 is contacted closely with both the wall surfaces 1a and 1b of the water basin 1, and a space between the filtering case 3 and the corner 2 is closed. Therefore, it can reliably prevent aquarium fishes from entering between the filtering case 3 and the basin 1 to be immovable.

Then, the water suction case 5 is to be mounted in the bottom of the basin 1. Since the rectangular vacant space is provided among the first, second and third suction portions 53, 54, 55 of the water suction case 5 and the lower case 52 is formed in a Y shaped cross-section, even if the gravel 4 has already been spreaded in the basin 1, the water suction case 5 can be remarkably easily mounted by burying it in the gravel 4 by pushing the water suction case 5 into the gravel 4.

After the water suction case 5 is mounted, the flexible tube 73 connected to the water suction case 5 is inserted to be connected to the connecting port 37 of the connecting tube 33. This connecting operation is easily carried out in the water, and the gravel 4 is not entered the connecting tube 33.

The mounting sequence of the filtering base 3 and the water suction case 5 may be reverse to that described above.

When the pressurized air supply source 40 is operated after the mounting is completed as described above, a rising water stream is generated in the suction tube 16. Thus, the water sucked from the water intake port 30 into the unpurified chamber 22 is fed through the filtering material 21 into the purifying chamber 23 while being purified, and is risen from the suction port 29 in the suction pipe 16 and further circulated from the drain port 13 to the basin 1. In this case, since the suction port 29 is provided at the lower portion of the suction pipe 16, the entire hydraulic pressure of the depth to the water suction port 29 from the water surface is applied to the suction port 29 to efficiently pump the water, and the water fed from the unpurified chamber 22 to the purifying chamber 23 is filtered over the entire surface of the filtering material to be efficiently purified.

On the other hand, in response to a rising water stream generated in the suction pipe 16, a water stream from the first passage 61 through the second passages 62 to the third passage 63 is generated even in the water suction case 5, the water filtered through the gravel 4 to be purified is fed from the suction ports 65, 66, 67 to the first, second and third passages 61, 62, 63, and further sucked through the flexible tube 73 and the connecting pipe 33 by the pumping pipe 33.

In this case, since the suction ports 65, 66, 67 are disposed lower than the collars 64, they are faced to the cavity generated in the gravel 4 by the collars 64. In addition, since the suction ports 65 to 67 are formed relatively small, it can prevent the gravel 4 from being clogged to block the suction ports 65 to 67 as much as possible.

Since the third passage 63 at the side of the suction pipe 16 is formed relatively large in the cross-sectional area, the flowing loss along the longitudinal direction of the passage 63 is extremely small. Therefore, the water flowing quantities of the first and second passages 61 and 62 to uniformize the quantity of water filtered through the gravel 4 can be equalized over a wide range, and the gravel 4 can be utilized in a wide range to efficiently filter the water.

As described above, the filtration by using the gravel 4 and the filtration by using the filtering material 21 are combined in good balance to sufficiently filter the water in the basin 1. In addition, since the water rising in the suction pipe 16 is comprised of the water purified by the filtering material 21 and the water purified by the gravel 4, the velocity of the water fed from the water intake port 30 to pass the filtering material 21 in the filtering case 3 can be adjusted to a suitable value for accelerating the cultivation of chlorella and aerobic microbes, so that the organic substances such as leftover baits and dungs of aquarium fishes can be decomposed by the aerobic microbes to prevent the clogging of the filtering material 21, and the chlorella can be provided as fresh baits for the aquarium fishes.

Figure 13:
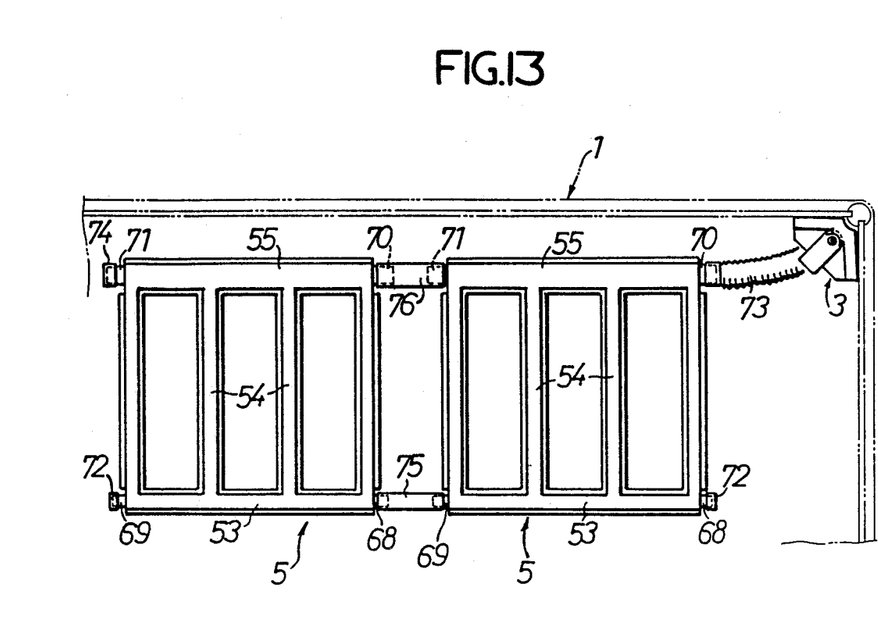
FIG. 13 is a plan view of another embodiment of the present invention.

FIG. 13 illustrates another embodiment of the present invention, wherein two water suction cases 5, 5 are interconnected to be mounted in the bottom of a water basin 1. In other words, a connecting portion 69 of a first water suction portion 53 of one water suction case 5 and a connecting portion 68 of a first water suction portion 53 of the other water suction case 5 are interconnected by a connecting pipe 75, and the connecting portion 71 of the third suction portion 55 of one water suction case 5 and the connecting 70 of the third suction portion 55 of the other water suction case 5 are interconnected by the connecting pipe 76.

As described above, a plurality of water suction cases 5 can be interconnected in response to the area of the water basin 1 to adjust the filtering area of the gravel 4.

While the invention has been particularly shown and described in reference to preferred embodiments thereof, it will be understood by those skilled in the art that changes in form and details may be made therein without departing from the spirit and scope of the invention.

What is claimed is:

1. A filtering device, comprising a water suction case which is buried in gravel spread over the bottom of a water basin so as to cause said gravel to exhibit a filtering function; and a pumping means connected to the water suction case for circulating water within a water flow passage arrangement defined in said water suction case toward an upper side in an interior portion of said water basin, said water suction case being provided with a plurality of water suction ports connected to said water flow passage arrangement, wherein said water suction case comprises a first linear suction portion, a plurality of second linear suction portions connected perpendicularly to said first suction portion at intervals therebetween in a longitudinal direction of said first suction portion, and a third suction portion extending parallel to said first suction portion and connected perpendicularly to said second suction portions, said water flow passage arrangement having a first flow passage defined within said first suction portion, second flow passages within said second suction portions and a third flow passage within said third suction portion, said third flow passage having a cross-sectional area larger than cross-sectional areas of said first and second flow passages, said first and second passages being communicated with said pumping means through said third passage, and wherein said first, second and third suction portions are provided with flanges which are laterally and integrally projected from opposite sides of said first, second and third suction portions, respectively, said water suction portions having water suction ports, and means for disposing said water suction ports above the bottom of the water basin and inwardly of the flanges with at least one said water suction port in at least an elevation below, above and the same as said flanges.

2. A filtering device according to claim 1, wherein each of said first, second and third suction portions has a lower part formed with a substantially Y-shaped cross-section having a substantially V-shaped bottom plate portion which opens upwards and a leg portion which downwardly extends from a bent portion of said bottom plate portion, each of said water suction ports being perforated at a connection between said bottom plate portion and said leg portion.

3. A filtering device according to claim 1, wherein said water suction case comprises an upper case and a lower case which are fitted and connected with each other, said flanges being provided on said upper case and said water suction ports being provided on the lower case.

4. A filtering device according to claim 1, wherein said first flow passage is divided by partition plates into a plurality of rooms and said rooms are in communication with said respective second flow passages.

5. A filtering device according to claim 4, wherein said water suction ports of said first suction portion are each formed to straddle over said partition plate so as to communicate with two rooms on opposite sides of said plate.

6. A filtering device according to claim 1, wherein said first and third suction portions are each provided at longitudinal opposite ends thereof with connecting portions of a short tube shape which can be closed by detachable closure means.

7. A filtering device according to claim 1, further comprising a filtering case extending vertically and having a plurality of water intake ports provided at a lower portion thereof, said filtering case being detachably mounted to a wall of said water basin with said water intake ports being located at a position above said gravel in said water basin, a filtering material being inserted into said filtering case to define therein an unpurified chamber leading to said water suction ports and a purifying chamber communicating with said pumping means, said pumping means communicate through a connecting tube with said third flow passage of said water suction case.

8. A filtering device according to claim, wherein said connecting tube extends vertically and has a closed lower end which is provided with a sucker, a connecting port being opened at a lower side face of said connecting tube and being connected to said water suction case through a flexible tube.

\* \* \* \* \*

UNITED STATES PATENT AND TRADEMARK OFFICE
CERTIFICATE OF CORRECTION

PATENT NO. : 4,897,188

DATED : January 30, 1990

INVENTOR(S) : Yonekichi OGAWA

It is certified that error appears in the above-identified patent and that said Letters Patent is hereby corrected as shown below:

Column 10, line 31, "claim," should read --claim 7,--.

Signed and Sealed this

Nineteenth Day of February, 1991

*Attest:*

HARRY F. MANBECK, JR.

*Attesting Officer*          *Commissioner of Patents and Trademarks*